United States Patent [19]

Bader

[11] Patent Number: 4,902,366

[45] Date of Patent: Feb. 20, 1990

[54] PROCESS AND APPARATUS FOR BONDING AND EMBOSSING SHEET MATERIALS, PARTICULARLY FIBER MATTING

[75] Inventor: Hans Bader, Hanover, Fed. Rep. of Germany

[73] Assignee: Corovin GmbH, Peine, Fed. Rep. of Germany

[21] Appl. No.: 142,544

[22] Filed: Jan. 11, 1988

[30] Foreign Application Priority Data

Jan. 10, 1987 [DE] Fed. Rep. of Germany ....... 3700609

[51] Int. Cl.[4] .................................................. B32B 5/00

[52] U.S. Cl. ..................................... 156/296; 156/181; 156/209; 156/555; 156/582; 428/198; 428/296; 425/168; 425/385; 264/284

[58] Field of Search ............... 156/290, 555, 181, 209, 156/582, 553, 296; 428/198, 296; 425/168, 372, 385; 264/284

[56] References Cited

U.S. PATENT DOCUMENTS 2,036,051 4/1934 Kieffer ................................ 156/582

3,636,147 1/1972 Rowland ............................. 264/284

*Primary Examiner*—Merrell C. Cashion, Jr.

*Assistant Examiner*—Michele K. Yoder

*Attorney, Agent, or Firm*—Collard, Roe & Galgano

[57] ABSTRACT

A process and apparatus for bonding and embossing of sheet material is disclosed. The apparatus uses a pair of rotating calender rollers which are spaced apart. Sheet material is introduced into the space between the rollers. The calender rollers are equipped with raised, discrete points which form a surface design and determine the embossing design produced on the sheet material. The calender rollers are each driven at a synchronous speed by a drive system having the capability of varying the speed of one roller for a short period of time. This change in speed causes the surface designs of both calender rollers to shift relative to one another. This results in different degrees of overlap between opposing pairs of raised points. Thus, different embossing surface patterns can be produced as the overlapping areas are adjusted while the machines are in operation. This eliminates the necessity of replacing the calender rollers when a change of embossing patterns is desired.

7 Claims, 6 Drawing Sheets

PROCESS AND APPARATUS FOR BONDING AND EMBOSSING SHEET MATERIALS, PARTICULARLY FIBER MATTING

BACKGROUND OF THE INVENTION

1. Field of the Invention

This invention relates to a process which can be used for any combination of stiffening, thermally bonding, embossing or shaping sheet or strip materials. Specifically, the invention relates to a process and apparatus in which embossing design or percentage of bonded area may be almost continuously varied during the ongoing production operation.

2. Description of the Prior Art

As is common knowledge, processes and apparatuses of this type have calender rollers which are used to process and machine sheet materials, such as fiber matting. The calender rollers are used to stiffen, produce decorative patterns or thermally bond the sheet material. In this process, one or both rollers may be heated and additionally, one or both rollers can be provided with a surface area design which is formed by raised, discrete points extending over the calender rollers.

The fiber matting is introduced, under pressure, into a gap formed between the spaced apart rotating calender rollers. The extent or degree of overlap between opposing pairs of raised, discrete points, creates an embossing surface. This surface determines the pattern of the finished sheet or fiber matting which results in a bonding or stiffening of the embossed surfaces.

A process as described above was made public by West German patent DE OS 21 07 887 and utilizes two calender rollers. Each roller exhibits a surface area design composed of raised, discrete points which are heated and insulated. According to the process disclosed, the calender rollers are rotated in such a way that the raised points on each roller overlap at least to some degree.

Because of the surface area design of the calender rollers used in the prior art process, a very specific embossing pattern results on the fiber matting or sheet. The fiber matting, accordingly, possesses a very specific embossed surface, which is indicated by a percentage.

If it is intended that the end product be a soft material, a relatively small embossing surface is sufficient. For more durable materials, a larger embossing surface must be selected. Therefore, depending on what is required from the desired end product, it is necessary to utilize different calender rollers corresponding to the embossing surface desired. Consequently, the prior art calender rollers must be replaced when a different embossing surface is required.

The disadvantage in replacing calender rollers to achieve different embossing surfaces is easily recognized. The process of changing rollers requires a great deal of time and results in longer production downtime. This is because calender rollers are quite heavy and a great deal of time is needed to replace them. In order to eliminate this downtime and enable a more rapid replacement of rollers to achieve different embossing surfaces, the industry has aleady begun equipping several individual calender stands with two calender rollers each. Each calender stand is outfitted with a smooth roller and an embossed roller, each having a different surface area design. In so doing, the different embossing rollers can be put into operation relatively quickly, as needed. Even this solution is very time-consuming because of the large number of embossing rollers involved and also because these numerous calender stands require a significant amount of working space.

For this reason, the most commonly used method is still to stop production whenever a change in the embossing pattern or embossing surface is necessary and to carry out the time-consuming calender roller replacement.

The present invention overcomes these problems by providing a process as well as an apparatus capable of implementing the process, which enables rapid and consequently extremely economical embossing design change. With this process one can quickly change from an initial embossing design to another desired design or to another embossing surface percentage. This process and apparatus also enables an almost continuous variation of the embossing surface percentage during ongoing production operations.

In summary, the present invention, as it relates to the thermal bonding of fiber matting materials, for example, provides the following advantages over the prior state of the art:

(a) Machine downtime incurred in replacing embossing surfaces is significantly reduced or eliminated.

(b) The specified values for the consistency of finished matting can, through gradual adjusting of the embossing area during thermal bonding, be safely maintained during production. This can be done despite variations in raw materials and/or variations in fiber orientation.

(c) Investment costs for embossing rollers, when several embossing patterns are used, are drastically reduced. If, for example, three different embossing patterns are used, traditional technology requires eight rollers, including replacement rollers. When the present invention is used, only four rollers, including replacement rollers, are required.

(d) Lower costs for embossing rollers because, when two "patterned" rollers are used (rather than one smooth), the etching depth of each roller need only be half as deep.

(e) Matting that has been thermally bonded through application of the invention has a distinctly softer "feel". This is because "secondary bonds" are not present. These bonds develop as a result of the complete contact of one side with a smoothing roller which is representative of current state of the art.

SUMMARY OF THE INVENTION

It is an object of this invention to provide a process and apparatus for stiffening, thermally bonding, embossing and shaping sheet or strip materials.

It is a further object of this invention to provide a process and an apparatus for practicing the process in which the embossing design produced by a pair of calender rollers may be continuously varied during the ongoing production operation.

It is yet an additional object of this invention to provide a process and a machine for embossing sheet materials, such as fiber matting, which is simple in design, economical to operate and which can produce a wide variety of embossing patterns on the finished product.

Accordingly, these objects are achieved by a process for calendering sheet material which includes inserting the sheet materials into a gap between two spaced parallel calender rollers. Both rollers have a raised embossing pattern formed thereon. The calender rollers are aligned and driven in a manner to produce a predetermined overlap between opposed elements of the raised embossing patterns formed on each roller. The sheet material is inserted and is pulled through the calender rollers by the rotation thereof, and embossed corresponding to the predetermined overlap between the opposed raised elements on each roller. A drive system is provided which is capable of varying the speed of at least one of the rollers with respect to the other. Varying the speed and extent of overlap between the raised opposed elements of the embossing pattern on the rollers produces a varied embossing pattern on the sheet material.

Initially, the drive system drives the rollers at a synchronous speed and then temporarily varies the speed of at least one of the rollers in relation to the other and then readjusts the speed back to the synchronous speed. In addition, the rollers may be mounted in a manner whereby they may be axially shifted in relation to one another to provide an alternate method of producing a varying overlap and a varying embossing pattern.

The present invention is based on the fact that both calender rollers are driven at identical speeds. Thus, a very definite, preset or predetermined degree or extent of overlap and a very definite embossing surface percentage is achieved. The invention additionally provides for deviating from the synchronous operation of both calender rollers for a short period of time. The practical effect of this is to cause a phase shift between the revolution of the individual rollers. Immediately thereafter, the process allows both calender rollers to switch back to the identical synchronous speed.

A different amount of overlap results from the short duration phase shift. This results in other surface areas of the raised, discrete points being positioned over each other than was the case before the phase shift. The embossing surface percentage is thereby altered. The embossing surface percentage therefore, can be easily modified, depending on what is required of the end product. Specifically, this modification can take place during ongoing production operations and constitutes a particularly important advantage of the invention. The laborious replacement of calender roller previously necessary to make adjustments for the different embossing surfaces of the desired end product is no longer required.

With the devices and processes now known in the art, strict attention must always be given to the exact synchronization of both calender rollers The present invention, by comparison, takes the unusual approach of suspending this synchronized operation for a short period of time and then reestablishing it. As a result of the shift in the surface areas which overlap each other when the calendar rollers roll away, a new embossing pattern is produced. This is accomplished without having to replace the calender rollers themselves. Instead, the already-installed calender rollers can be used without modification.

Usually, calender rollers with a so-called "camber" are utilized. A calender roller with a camber has a slightly curvilinear, external circumferential line. In the present invention, the calculated camber can be equally apportioned to both calender rollers. Of course, the invention is not restricted to use of rollers with a camber.

When cylindrical calender rollers are used, different embossing surfaces can, in addition to the method described above, also be achieved by positioning and supporting both calender rollers in an axial direction, such that they may be shifted axially. In this case, then, the synchronous speed of both calender rollers can be retained. Modification of the degree or extent of overlap in this embodiment occurs via the axial shifting of one calender roller in relation to the other.

Preferably, a drive system having an adjustable gear mechanism is provided to drive the calender rollers at a synchronous speed. This drive unit will enable the constant phase shifting of one calender roller in relation to the other calender roller. This results in the advantage of only having to use a single drive motor. The drive system, which consists of a motor and transmission gear, functionally forms a single unit. The transmission gear, in this instance, has an input shaft from the motor and two output shafts, one for each calender roller. An adjustable differential gear mechanism is integrated with the main transmission gear and can be actuated either manually or with a servo-motor via a control shaft.

Other objects and features of the present invention will become apparent from the following detailed description considered in connection with the accompanying drawings, which disclose several embodiments of the invention. It is to be understood that the drawings are to be used for the purpose of illustration only, and not as a definition of the limits of the invention.

BRIEF DESCRIPTION OF THE DRAWINGS

In the drawings, wherein similar reference characters denote similar elements throughout the several views.

DETAILED DESCRIPTION OF THE PREFERRED EMBODIMENTS

Figure 1:
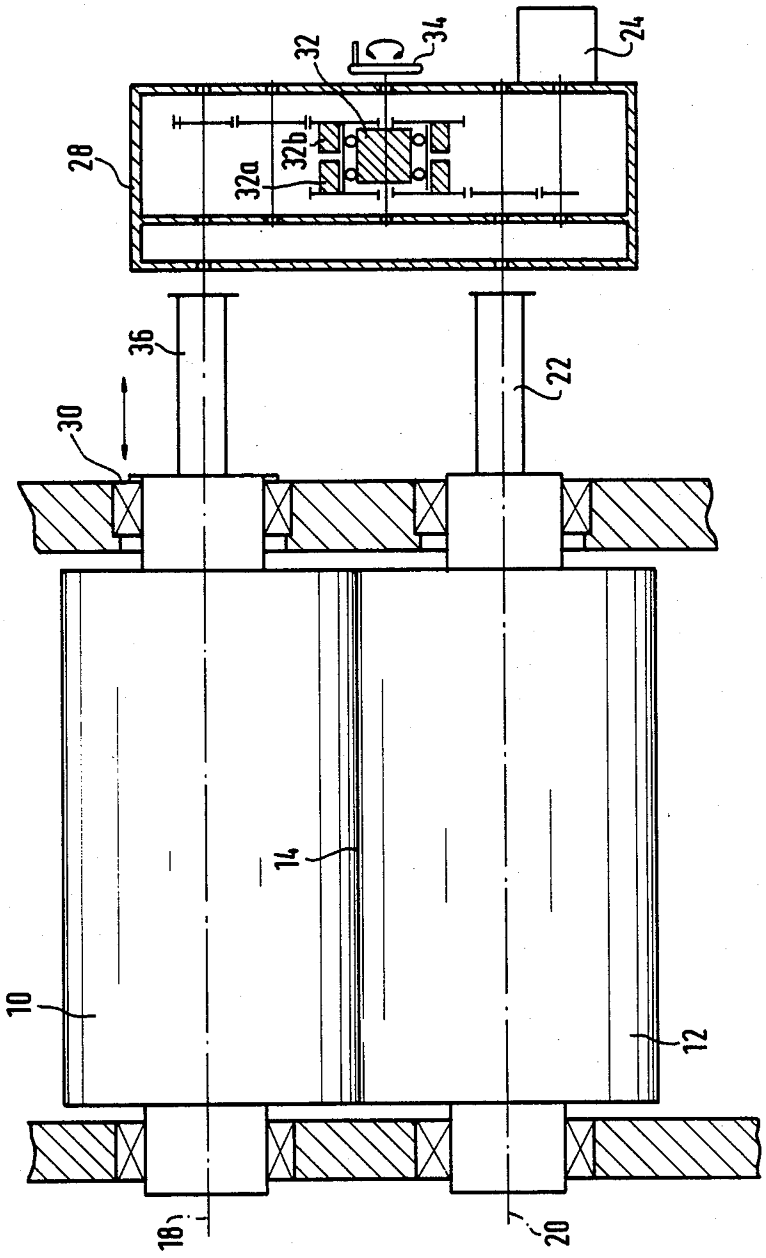
FIG. 1 is a schematic cross-sectional view of two calender rollers driven by a single motor via a transmission gear.

Referring to FIG. 1, there is shown an apparatus having an upper calender roller 10 and a lower calender roller 12 which are driven at identical speeds (RPM) but in opposite directions. Sheet material can be introduced into a space or gap between the calender rollers along a contact plane 14 by applying longitudinal pressure and thus embossed. While calender rollers 10 and 12 may have a camber, the use of cylindrical calender rollers is also possible.

Upper calender roller 10 and lower calender roller 12 are driven by motor 24 through a transmission gear system generally denoted as 28 and via drive shafts 22 and 36 in such a way that they operate synchronously. Transmission 28 includes an adjustable gear mechanism 32, which is a differential gear (harmonic drive or Specon differential gear), either of which are well known in the art. Gear mechanism 32 may be adjusted via the control shaft 34, either manually or by use of a servomotor during operation. Normally, therefore, the identical rotary motion is transmitted unaltered by transmission gear 28 to drive shaft 22.

It is possible, however, via control shaft 34, to effect a modification in the "speed ratio" of adjustable gear mechanism 32. Thus, the input speed of adjustable gear mechanism 32a deviates for a short period of time from the output speed at output 32b. Thereafter, the original transmission characteristics of adjustable gear mechanism 32 are re-established; that is, both calender rollers 10 and 12 are again driven at identical speeds.

During the short adjusting period brought about by control shaft 34, a shift, hereinafter described in greater detail, takes place. This shift occurs between the surfaces of calender rollers 10 and 12, which shift results in different degrees of overlap 42 or 48, as can be seen in FIGS. 3, 4, 5 and 6.

Figure 2:
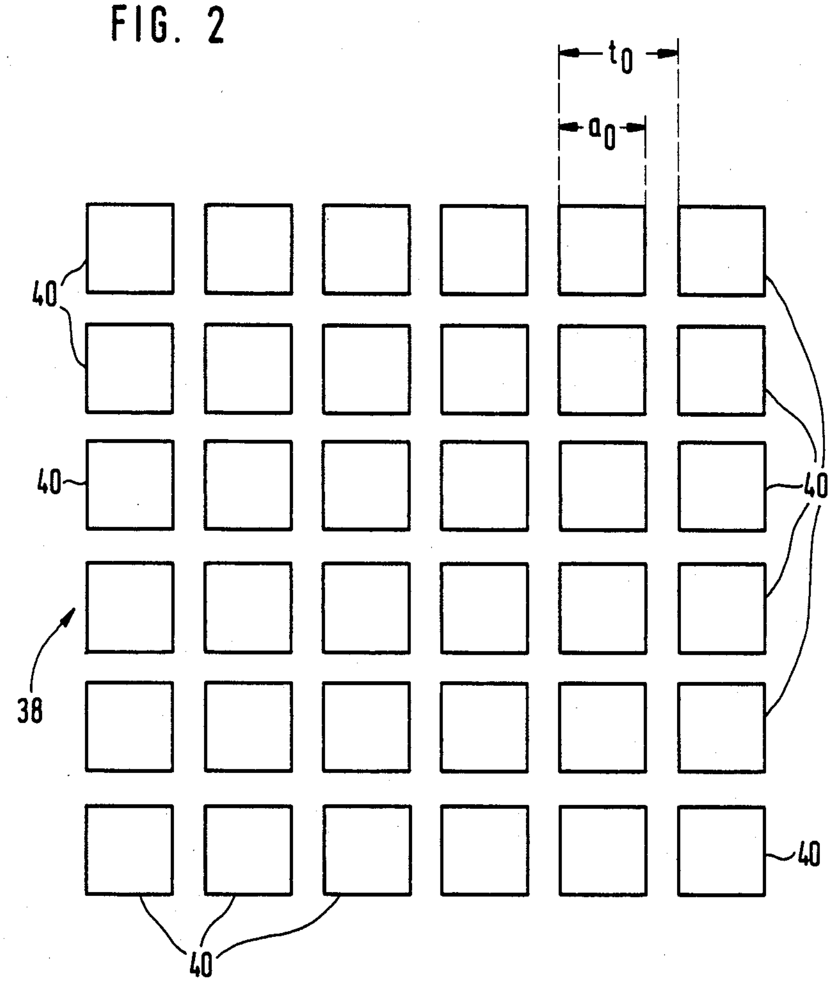
FIG. 2 is an enlarged view of the embossing pattern on the surface of each of the calender rollers shown in FIG. 1.

Both calender rollers 10 and 12 possess identical surface area designs 38, which are shown in FIG. 2. The surface area design 38 is formed by a multitude of raised points in the form of squares 40, which are arranged in a regular pattern. The squares 40 may be heated and insulated. Side $a_0$ designates a side of square 40, and $t_0$ indicates the separation which, as shown in FIG. 2, is equal in both the horizontal and vertical directions. Sides $a_0$ of squares 40 run parallel or perpendicular to respective axis 18 or 20 of appurtenant calender rollers 10 and 12.

Figure 3:
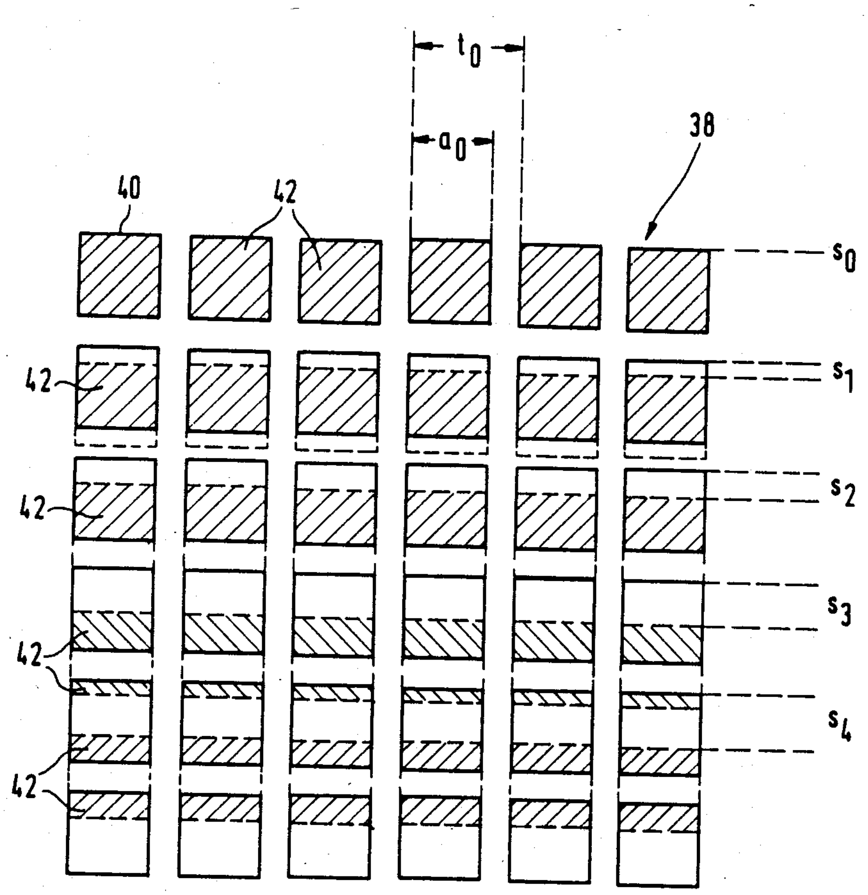
FIG. 3 is a representation of different degrees of overlap which can be achieved with a pair of calender rollers having the embossing design of FIG. 2.

When both calender rollers 10 and 12 are adjusted in relation to each other, such that the pairs of raised points 40 of the surface area design 38 lie opposite one another during rotation, they will lie exactly above one another during rotation. Thus, each opposing square 40 of calender roller 10 coincides exactly with the opposing square 40 of calender roller 12, and the surface of each square is completely covered. This situation is shown in FIG. 3, in the uppermost row. The cross-hatching 42 serves to indicate that the extent or degree of overlap is complete, so that the entire surface of each of squares 40 is covered.

In the example described above, the embossing surface F has the maximum value $F_{max}$ and the minimum value $F_{min}$, which is stated in percentages and which can be formulated as follows:

$$F_{max} = \frac{a_0^2}{t_0^2} \cdot 100\%$$

$$F_{min} = \frac{2a_0^2 - a_0t_0}{t_0^2} \cdot 100\%$$

Thus, for the ratio of $F_{max}$ to $F_{min}$, the following relationship results:

$$\frac{F_{max}}{F_{min}} = \frac{a_0}{2a_0 - t_0}$$

In the uppermost row in FIG. 3, which exhibits complete coverage or overlap, a shift $s_0$ between both calender rollers 10 and 12 has been assumed. In the uppermost row, shift $s_0$ is equal to zero, since individual squares 40 are superimposed above one another with their surfaces being completely covered. If, with the aid of control shaft 34 or adjustable gear mechanism 32, as described above, an adjustment of short duration is executed, a shift from the completely superimposed position results. This produces the effect that opposing squares 40 of both calender rollers 10 and 12 will now only partially overlap each other.

This position is shown in FIG. 3 in the second through sixth row for different shifts $s_1$, $s_2$, $s_3$ and $s_4$. The cross-hatching indicates the different degrees of overlap 42 at any given time.

In surface area design 38 shown in FIG. 3 it can be seen that the sides $a_0$ of squares 40 are greater than $t_0/2$. In the case of a shift where $s_0=0$ (uppermost row in FIG. 3), the embossing surface $F_0$ is calculated as follows:

$$F_0 = \frac{a_0^2}{t_0^2} \cdot 100\% \text{ (where } s_0 = 0)$$

The embossing surface percentage for the remaining shifts $s_{1-4}$ shown in FIG. 3 are calculated from the following relationships:

$$F_1 = \frac{a_0(a_0 - s)}{t_0^2} \cdot 100\% \text{ (where } o < s < t_0 - a_0)$$

$$F_2 = \frac{a_0(2a_0 - t_0)}{t_0^2} \cdot 100\%$$

$$= \frac{2a_0^2 - a_0t_0}{t_0^2} \cdot 100\% \text{ (Where } s = t_0 - a_0)$$

$$F_3 = \frac{2a_0^2 - a_0t_0}{t_0^2} \cdot 100\% \left(\text{Where } t_0 - a_0 < S < \frac{t_0}{2}\right)$$

$$F_4 = \frac{2a_0^2 - a_0t_0}{t_0^2} \cdot 100\% \left(\text{Where } s = \frac{t_0}{2}\right)$$

The maximum embossing surface is:

$$F_{max} = \frac{t_0^2}{4t_0^2} \cdot 100\% = 25\%$$

$F_{max}$ can be achieved where $a_0=t_0/2$, in which half the separation is equal to the length of the side of a square, while the minimum embossing surface is determined by the following relationship:

$$F_{min} = \frac{\frac{2t_0^2}{4} - \frac{t_0 \cdot t_0}{2}}{t_0^2} \cdot 100\% = 0\%$$

The calculation of $F_{min}$ results in zero. Of course, this latter situation should not be allowed to occur since no overlap exists. The individual raised points on the surfaces of both calender rollers "comb off" and do not touch. This situation can be identified with the aid of the surface area design shown in FIG. 4, where the relationship:

$$a_0 \leqq \frac{t_0}{2}$$

is utilized for the different shifts $s_0$, $s_1$ and $s_2$. The following calculation formulas for the embossing surfaces are applied:

$$F_0 = \frac{a_0^2}{t_0^2} \cdot 100\% \text{ (where } s = 0)$$

$$F_1 = \frac{a_0 (a_0 - s)}{t_0^2} \cdot 100\% \text{ (where } 0<s< a_0)$$

$$F_2 = 0\% \text{ (where } s = a_0)$$

Cross-hatching 50 indicates that no overlap occurs between individual squares 40 of upper and lower calender rollers 10 and 12. Rather, these squares are "combing off" next to each other. The shift $s_2$ is not used, therefore, because no embossing will be achieved.

For purposes of illustration, some numerical examples are provided in the following table, which includes the numerical results obtained when embossing patterns 38 are in accordance with FIGS. 3 and 4. For example, where a=1 mm and t=1.75 mm, a maximum embossing surface $F_{max}$ of 32.65% and a minimum embossing surface $F_{min}$ of 8.16% is calculated. As can be seen, then, different embossing areas can be achieved within a relatively large band width by means of the adjustable gear mechanism. These different embossing surfaces may be produced while the machines are in operation and without having to replace the calender rollers 10 and 12.

Where the separation t remains constant and a=1.3 mm, the maximum embossing surface $F_{max}$=55.18% and the minimum embossing surface $F_{min}$=36.07%.

Depending upon what is required of the desired end product, the different embossing surfaces are thus easily achieved with the apparatus and process of the invention.

TABLE 1

Figure 4:
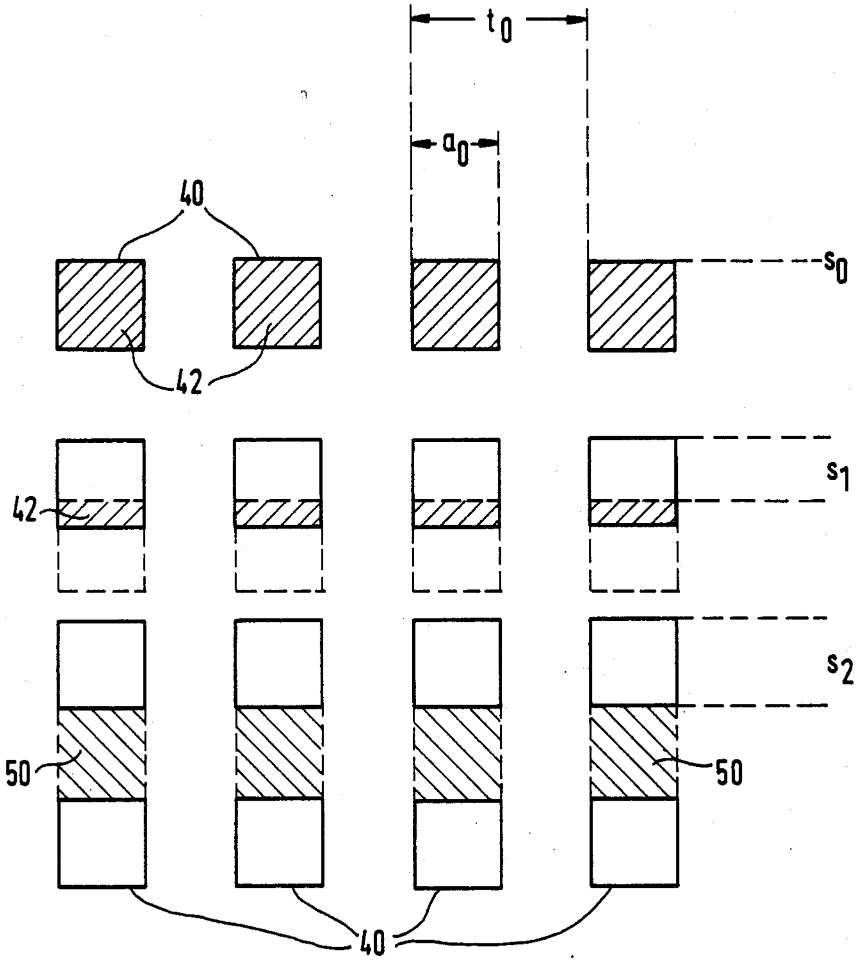
FIG. 4 is a representation of the degrees of overlap possible with an alternate embossing pattern.

(For embossing patterns shown in FIGS. 3 and 4)

| a | t | $F_{max}$ $\frac{a^2}{t^2} \cdot 100$ | $F_{min}$ $\frac{2a^2 - at}{t^2} \cdot 100$ | $F_{max}/F_{min}$ $\frac{a}{2a - t}$ |
|---|---|---|---|---|
| mm | mm | % | % | — |
| 0.875 | 1.75 | 25.00 | 0 | ∞ |
| 1.000 | 1.75 | 32.65 | 8.16 | 4.0000 |
| 1.100 | 1.75 | 39.51 | 16.16 | 2.4444 |
| 1.200 | 1.75 | 47.02 | 25.46 | 1.8461 |
| 1.250 | 1.75 | 51.02 | 30.61 | 1.6666 |
| 1.300 | 1.75 | 55.18 | 36.07 | 1.5294 |
| 1.400 | 1.75 | 64.00 | 48.00 | 1.3333 |
| 1.500 | 1.75 | 73.46 | 61.21 | 1.2500 |
| 1.600 | 1.75 | 83.59 | 75.75 | 1.1034 |
| 1.700 | 1.75 | 94.36 | 91.58 | 1.0303 |
| 1.750 | 1.75 | 100.00 | 100.00 | 1.0000 |

Figure 5:
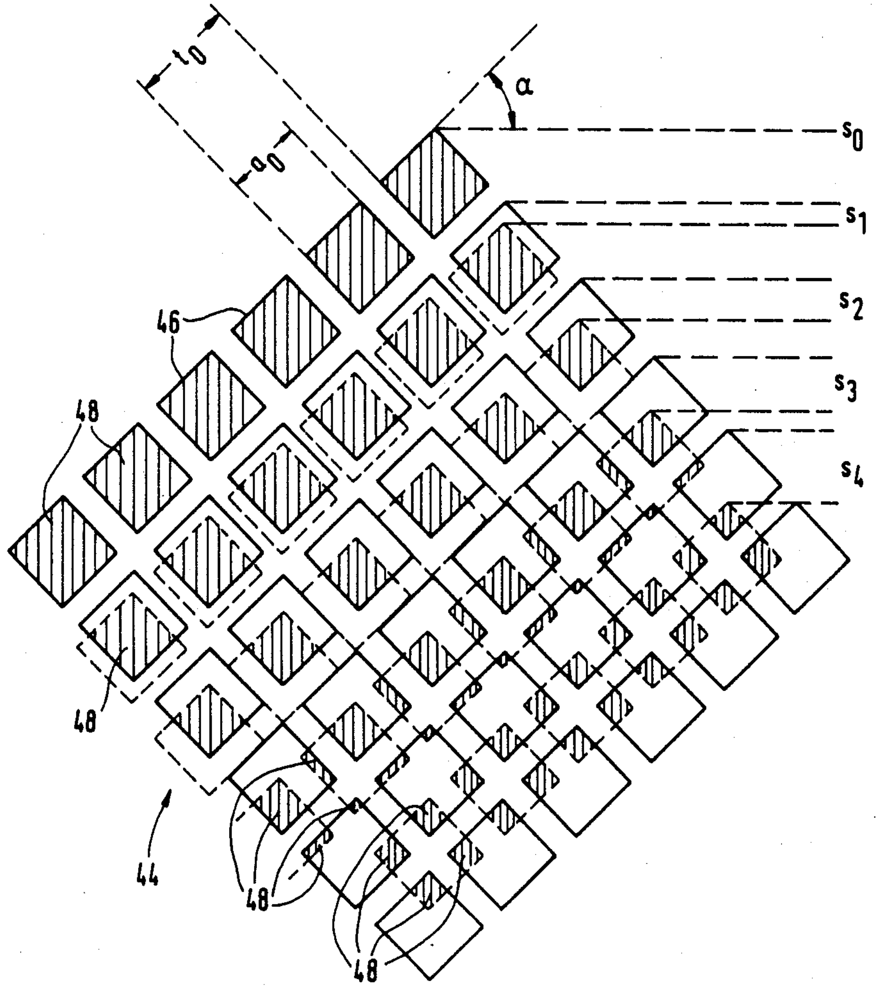
FIG. 5 is an enlarged view of a roller surface area embossing design placed at a angle to the longitudinal axis of the calender rollers and therefor exhibiting a different degree of overlap.
Figure 6:
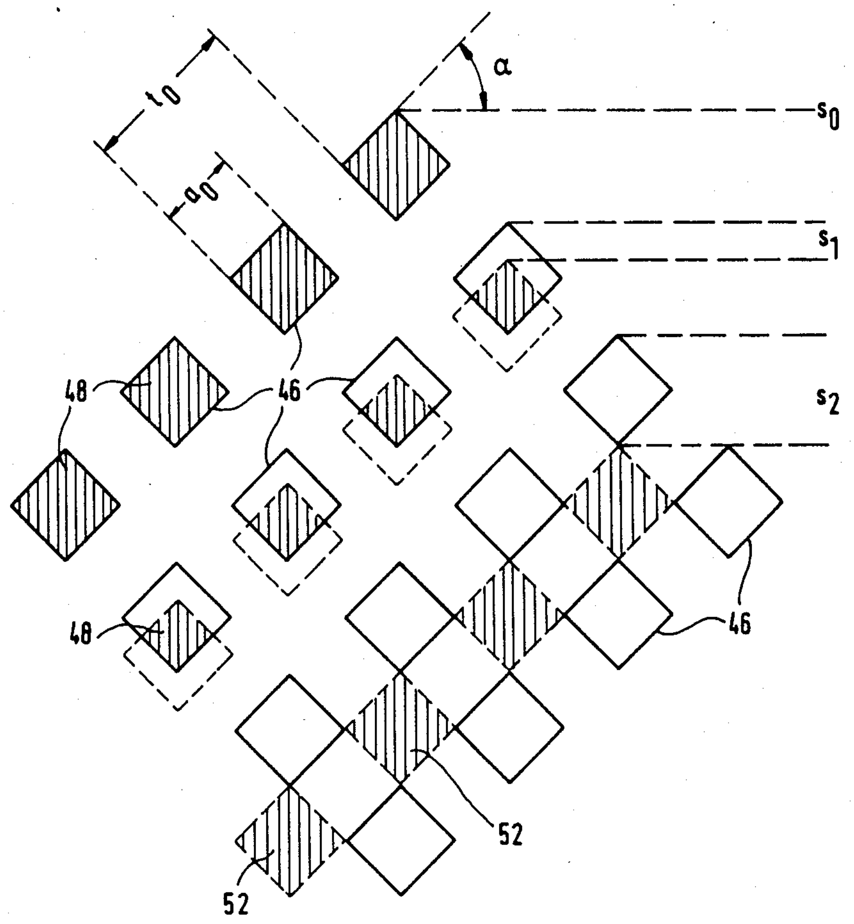
FIG. 6 is an enlarged view of an alternate surface pattern design for producing different overlap patterns, which surface area design is placed at an angle with respect to the longitudinal axis of the calender rollers.

In the examples of embossing patterns shown in FIGS. 2–4, the lateral surfaces of squares 40 run parallel or perpendicular to axes 18 to 20 of calender rollers 10 and 12. It is possible, however, to arrange the squares which form the surface area design at an angle of inclination α relative to axes 18 and 20. Referring to FIGS. 5 and 6, there is shown a pattern where α=45°. This results in surface area design 44, which is again identical on both calender rollers 10 and 12. The raised points (squares) are designated by the reference number 46, and the individual degrees of overlap 48 are shown by cross-hatching. In general, the following relationships exist in such cases:

$$F_{max} = \frac{a_0^2}{t_0^2} \cdot 100\%$$

-continued $$F_{min} = \frac{4a_0^2 - 4a_0t_0 + t_0^2}{t_0^2} \cdot 100\%$$

$$\frac{F_{max}}{F_{min}} = \frac{a_0^2}{4a_0^2 - 4a_0t_0 + t_0^2}$$

In the particular case where the lateral length $a_0$ is equal to half the separation $t_0$, the result for:

$$F_{max} = \frac{t_0^2}{4t_0^2} \cdot 100\% = 25\%$$

The minimum embossing surface $F_{min}$ is then 0%. The embossing surface percentage as a function of the different possible shifts s, is calculated in accordance with the following general relationship:

$$F(s) = \frac{2a^2 - sa\sqrt{2} + s_2}{2t^2} \cdot 100\%$$

The different degrees of overlap 48 which result from the different shifts $s_0$, $s_1$, $s_2$, $s_3$ and $s_4$ can be clearly distinguished in FIGS. 4 and 5 by cross-hatchings 48. FIG. 5 assumes that $a_0$ is greater than $t_{0/2}$, while in FIG. 6 $a_0$ is held at less than or equal to $t_{0/2}$. Just as with the pattern of FIGS. 3 and 4, embossing surface percentages can also be mathematically determined for the embossed shown in FIGS. 5 and 6, using the angle of inclination α=45° for different shifts. The results of these calculations are shown in Table 2.

TABLE 2

(For the Embossing Patterns Shown in FIGS. 5 and 6)

| a | t | $F_{max}$ $\frac{a^2}{t^2} \cdot 100$ | $F_{min}$ $\frac{4a^2 - 4at + t^2}{t^2}$ | $F_{max}/F_{min}$ $\frac{a^2}{4a^2 - 4at + t^2}$ |
|---|---|---|---|---|
| mm | mm | % | % | — |
| 0.875 | 1.75 | 25.00 | 0 | ∞ |
| 1.000 | 1.75 | 32.65 | 2.04 | 16.0000 |
| 1.100 | 1.75 | 39.51 | 6.61 | 5.9753 |
| 1.200 | 1.75 | 47.02 | 13.79 | 3.4082 |
| 1.250 | 1.75 | 51.02 | 18.37 | 2.7777 |
| 1.300 | 1.75 | 55.18 | 23.59 | 2.3391 |
| 1.400 | 1.75 | 64.00 | 36.00 | 1.7777 |
| 1.500 | 1.75 | 73.46 | 58.56 | 1.2544 |
| 1.600 | 1.75 | 83.59 | 68.65 | 1.2175 |
| 1.700 | 1.75 | 94.36 | 88.89 | 1.0615 |
| 1.750 | 1.75 | 100.00 | 100.00 | 1.0000 |

Note that shift $s_2$ in FIG. 6 does not result in any overlap whatsoever. On the contrary, cross-hatching 52 makes it clear that squares 46—as was the case in the bottom row of FIG. 4—"comb off" next to each other. This must not be allowed to occur in the practical applications of the invention.

The utility of the new process and of the new apparatus is not merely limited to the capability of easily setting different embossing surfaces while the calender rollers are in operation. On the contrary, as is evident in FIG. 5, it is also possible to produce the different embossing surfaces or degrees of overlap with different patterns. This makes it possible to achieve a variety of desired visual effects. Thus, by applying a constant rotational movement, uniform or non-uniform, to the adjustable control shaft of the adjustable gear mechanism, material with a constantly changing embossing pattern can be produced.

In the examples described, a shift in the direction perpendicular to axes 18 and 20 of calender rollers 10 and 12 was assumed, and this solution lends itself to cylindrical calender rollers and to those with a camber.

The concept behind the invention can, of course, also be implemented through a relative shift between the rollers in the direction of axes 18 and 20, by using an adjustable bearing 30 if cylindrical calender rollers are used. Also, a combination of variations in speed and axial shifts could be utilized.

The invention is not restricted to thermal bonding of a fiber matting. The invention can also be utilized to achieve surface effects or surface compositions on any kind of sheet materials such as paper, imitation leather, aluminum, etc.

While only several embodiments and examples of the present invention have been described, it is obvious that many changes and modifications may be made thereunto, without departing from the spirit and scope of the invention.

What is claimed is: .

1. A method for processing sheet material comprising:

inserting the sheet material into a gap between two parallel rotating calender rollers, each of said rollers having a raised pattern formed on the surface thereof by opposed elements thereon;

forming an embossed pattern on said sheet by pulling said inserted sheet material through said gap by the rotation of said calender rollers, said embossed pattern corresponding to an initial overlap in said gap between said opposed elements on said calender rollers; and varying the extent of overlap between said opposed elements on said raised pattern from said initial overlap while forming said embossing pattern by initially aligning and driving said rollers at identical speeds to produce said initial overlap and thereafter varying the extent of overlap between said opposed elements from said initial overlap by temporarily varying the speed of one of said calender rollers in relation to the speed of the other calender rollers from said identical speed for a time to allow a change in overlap and subsequently readjusting said speed to the initial identical speed to maintain said charge in overlap to thereby produce a varied embossing pattern on said sheet material.

2. A method as set forth in claim 1, wherein the extent of overlap between said opposing elements is varied by axially shifting at least one of said calender rollers with respect to the other.

3. A method as set forth in claim 1, further including the steps of:

rotating said calender rollers at a synchronous speed with a drive system including an adjustable gear mechanism; and cyclically adjusting said gear mechanism to shift the speed of one calender roller with respect to the other calender roller to thereby produce a constant phase shift in said initial overlap of opposing elements of said raised pattern.

4. A method as set forth in claim 1, wherein said process produces a stiffening of the sheet material.

5. A method as set forth in claim 1, wherein said process produces a thermal bonding of the sheet material.

6. A method as set forth in claim 1 wherein the sheet material is a fiber matting.

7. A method of strengthening and/or thermally bonding and/or stamping a fiber sheet at discrete sites, with two spaced rotatable calender rollers, the fiber sheet being guided through a space between the two rollers, the calender rollers of a type having raised discrete sites forming a surface pattern thereon, each calender roller being initially driven at a synchronous speed, so that a degree of coverage between oppositely disposed pairs of raised sites, such degree of coverage determining stamping areas, is adjustable to different values between a minimum and a maximum value, said method comprising:

varying the degree of coverage between opposite disposed pairs of raised sites from a first to a second value by briefly changing the number of revolutions of one of the two calender rollers, from the initial synchronous speed of the other calender roller and thereafter resetting said one calender roller to the initial synchronous speed, so that the raised sites subsequently constantly meet with each other with said second coverage.

* * * * *